Sept. 27, 1955  K. WILFERT  2,718,839
HEATING AND VENTILATING SYSTEM FOR MOTOR VEHICLES
Filed March 14, 1951
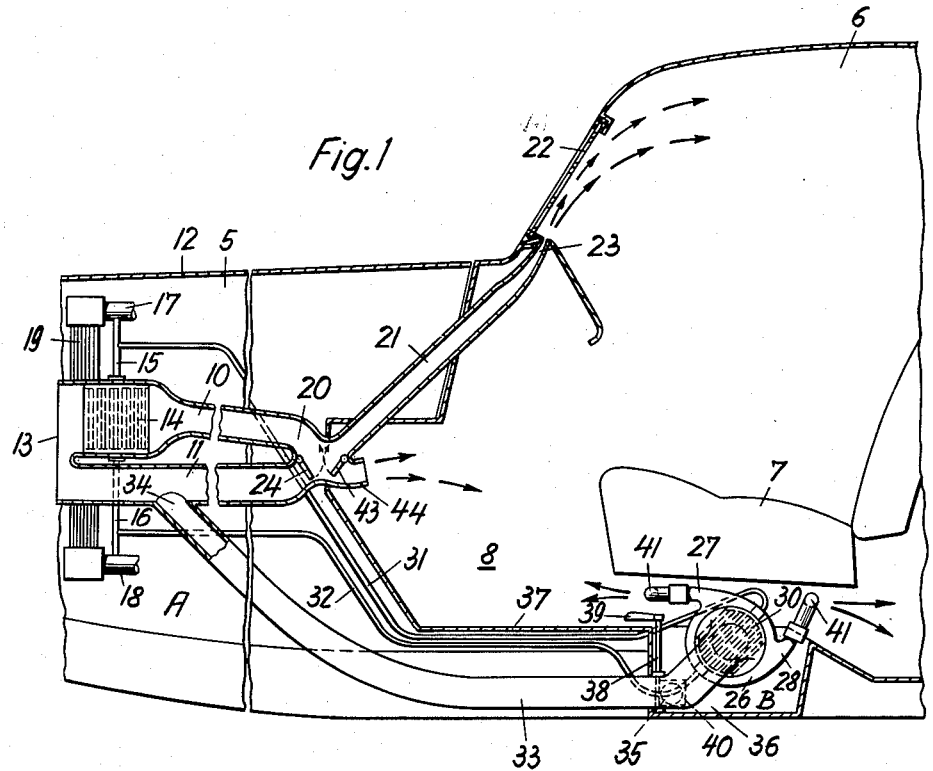
INVENTOR
KARL WILFERT
BY Dicke and Padlon
ATTORNEYS United States Patent Office 2,718,839
Patented Sept. 27, 1955

2,718,839

HEATING AND VENTILATING SYSTEM FOR MOTOR VEHICLES

Karl Wilfert, Stuttgart-Degerloch, Germany, assignor to Daimler-Benz Aktiengesellschaft, Stuttgart-Unterturkheim, Germany Application March 14, 1951, Serial No. 215,492

Claims priority, application Germany March 13, 1950

3 Claims. (Cl. 98—2)

This invention relates to and has for its object to provide an improvement in heating and ventilating systems for motor vehicles. The present invention contemplates among other things to provide such heating and ventilating systems with improved flexibility in operation for the requirements and comfort of the passengers.

Heating and ventilating systems are known whereby the interior of the motor car body is successively supplied either with cool or warmed fresh air, or with a warmed mixture of fresh air and so-called "circulation air" which is continually taken from the inside of the car body and re-circulated. However, in the practical employment of such heating and ventilating systems it has been noticed that the aforesaid possibilities of variation are not yet adequate to satisfy individual requirements, particularly of discriminating occupants. Thus, for example, it is considered to be a deficiency of the known systems that they do not render it possible to supply the separate sections of the motor car body interior simultaneously with air of different mixture and temperature. This demand is substantiated by the fact that for the purpose of preventing fog and steam on the windows it is most desirable to conduct possibly only fresh air taken from the outside, accordingly relatively dry air, to the upper part of the body interior and not to warm this air too much because the human body is much more comfortable with cool air around the head than it is with warm air. If, however, owing to this all of the remaining sections of the body interior are exclusively supplied also with moderately heated fresh air, the combined heating effect is too low for adequately warming the feet of the occupants, whereas at a higher temperature of the fresh air the bodies of the occupants dry out and the warm air makes itself unpleasantly felt at the head. If, on the other hand, a larger amount of circulation air continually taken from the interior is mixed with the heating air and re-circulated in order to prevent the drying out of the human body, it is indeed possible to warm this circulation air sufficiently so as to produce a comfortable feeling at the feet of the occupants and to prevent fog and steam on the windows; but then the re-heated and re-circulated stale inside air affects the heads of the occupants in an unpleasant manner and leads to fatigue.

The present invention therefore comprises in a heating and ventilating system for the interior of a motor car body in which cool or warmed fresh air, or re-heated circulation air, or a mixture of fresh air and circulation air is conducted to the interior means for simultaneously supplying the different sections of the interior with air of different temperature and mixture respectively. In the construction according to this invention these means are so formed that fresh air of adjustable temperature is conducted into the upper part of the vehicle body particularly near the windows, whereas warmed circulation air, or a mixture of warmed circulation air and fresh air, or alternatively also only cool or warmed fresh air is conducted into the lower part of the vehicle body.

These and other objects of the invention will more fully appear from the following description made in connection with the accompanying drawings wherein the preferred form of the invention has been shown.

In said drawings:

Fig. 1 shows a longitudinal vertical section through the front part of a passenger motor vehicle provided with the new heating and ventilating system, Fig. 2 shows a portion of the new heating and ventilating system in top plan view.

In the construction according to this invention the heating and ventilating system consists essentially of two units which operate substantially independently of each other; namely, an independent unit or device A accommodated in the engine compartment 5 serving mainly for supplying the upper part 6 of the body with fresh air, and a device B disposed underneath the front seats 7 for supplying the lower body part 8 with warmed circulation air, or with a mixture of warmed circulation air and fresh air, eventually also with cool fresh air. This division of the whole system into two constructional units A and B provides besides economy in manufacture and clearness of arrangement of ducts and pipes also the additional advantage that in the lower priced motor vehicle constructions for lesser demands on ventilation and heating each constructional unit can be used separately without any constructional changes.

The unit A of the whole system comprises essentially a warm-air pipe or conduit 10 and a cold-air pipe or conduit 11 which extend under the engine hood 12 along the side of the prime mover (not shown) of the motor vehicle and form a mutual air intake 13 at the front end of the vehicle. A heat exchanger such as a radiator 14 is disposed within the warm-air pipe 10. This heat exchanger is heated by the cooling water of the prime mover and for this purpose it is connected by means of pipes 15, 16 to the inlet connection 17 and outlet connection 18 of the fluid radiator 19 of the prime mover. The warm-air pipe 10 and the cold-air pipe 11 are joined at 20 to form a short mixing or combining pipe or conduit from where an upwardly inclined pipe 21 extends to one or more wide-mouthed nozzles 23 arranged closely below the windshield 22 of the vehicle. Arranged at the junction 20 of the pipes 10 and 11 is a change-over and throttle plate or valve 24 by means of which the cross-sectional area of either one of these two pipes may be more or less throttled or cleared.

By means of the boosted or increased pressure in the inlet 13, brought about by the forward movement of the car, outside air is forced into the pipes 10 and 11 and depending upon the position of the throttle plate 24 is blown either as cool air or as warmed fresh air through the nozzles 23 against the inside of the windshield 22 and thence into the upper part 6 of the vehicle body interior. This air movement may also be caused or assisted by a blower which is provided within the pipes for use when the car is slowed down or stopped.

The unit B for heating and ventilating the lower part 8 of the vehicle body comprises essentially a blower 26 with two outlet connections 27 and 28 and an air intake 29, and a heat exchanger 30 which is also supplied with warm water from the radiator of the vehicle is arranged in front of the air intake 29. The blower 26 is driven by a small electric motor 25. The suction pipe or conduit 33 leading to the heat exchanger 30 is connected at 34 to the fresh-air pipe 11 of the unit A and in addition is provided with a lateral opening 35 which extends into the lowermost space 36 of the body bottom 37 underneath the front seats 7. The cross-sectional area of this opening 35 and the cross-sectional area of that part of the suction pipe 33 situated in front of said opening may be narrowed at pleasure or also alternately closed entirely by means of a change-over and throttle plate or valve 40 which is provided on its fulcrum member 38 with a handle 39. Connected to the outlet connections 27 and 28 of the blower 26 are distributing pipes 41 extending transversely to the longitudinal axis of the vehicle and arranged horizontally underneath the front seats 7. These pipes 41 are provided with slots 42 which permit the air conveyed by the blower 26 to be blown into the foot space in front and rear of the seats. Depending upon the position of the throttle plate 40 the blower 26 may then discharge either inside or recirculated air through the opening 35, or only fresh air through the pipe 33, or a mixture of fresh air and inside air, eventually after the same is warmed by the heat exchanger 30, into the lower part 8 of the body interior.

Consequently, the described heating and ventilating system can be fully controlled by desired settings of the throttle plates 24 and 40 and for the time being physiologically most favorable and individually adjusted conditions for heating and ventilating the interior of the body can be produced at the pleasure of the driver and occupants, in that, for example, in cold weather only moderately warmed air is blown into the upper body part 6, by the unit A, whilst the lower part 8 is mainly supplied with circulation air, i. e., re-circulated inside air, of higher temperature by the unit B. Thus the feet of the occupants are kept warm and their heads are kept cool, untimely fatigue of the occupants is eliminated and the best conditions for keeping the windows free from fog and steam are produced. In warm weather the unit B can be shut down entirely and the lower space 8 can be supplied with fresh air by the unit A also, in that an additional fresh-air outlet 44 is opened by turning the throttle plate 43. Conversely, if there is no blower provided in the unit A an if there is no adequate pressure boost at the inlet 13 while the car is being slowed down or stopped, the supply of the entire inside of the body with fresh air may also temporarily be taken care of solely by the unit B.

The heat exchanger is easily removable as it is located ahead of the blower 26. During the hot season it can be replaced by a simple pipe section so as to increase the flow of cooling fresh air. Eventually, in the summer there might be provided a cooling element instead of the heat exchanger.

The present invention is not limited or restricted to the specific embodiment illustrated and described herein but may be varied within the scope of the several inventive concepts as defined by the appended claims.

What is claimed is:

1. A two-stage system for heating and ventilating the upper and lower part of the interior of a motor vehicle with a seating arrangement independently of one another comprising a first fresh-air conduit having a fresh air inlet at the forward end thereof, a heat exchanger within said first fresh-air conduit for heating the fresh air passing therethrough from the outside, a second fresh-air conduit substantially in parallel with said first fresh-air conduit having a fresh air inlet at the forward end thereof for conducting unheated fresh air passing therethrough from the outside, a mixing conduit connected to the rear ends of said fresh air conduits including a valve means for selectively controlling the flow of air from said fresh-air conduits into said mixing conduit, said mixing conduit extending and discharging into the upper part of the interior of the motor vehicle, a second heat exchanger including a blower under said seating arrangement, a branching conduit connected at one end thereof to said second fresh-air conduit at a point intermediate the two ends thereof and extending into the lower part of the interior of said vehicle, said branching conduit being connected at the other end thereof to said second heat exchanger, a discharge conduit with discharge openings under said seating arrangement connected to said second heat exchanger for discharging the air heated by said second heat exchanger under said seating arrangement, and a control means in said branching conduit for controlling the air supplied to said second heat exchanger, said branching conduit being provided with an opening communicating with said lower part of the vehicle and including valve means adjacent said opening for adjustably varying the ratio of fresh air from said second fresh air conduit to recirculated air from said opening flowing into said second heat exchanger.

2. System according to claim 1 including, a discharge opening connected to said combining conduit and leading into the interior of said body at a medium height of said body, and means for controlling the discharge of mixed air through said opening.

3. A two-stage heating and ventilating system for heating and ventilating the upper and lower part of the passenger compartment of a motor vehicle independently of one another comprising a first fresh air conduit extending from the front part of the vehicle rearwardly, a second fresh air conduit also extending from the front part of said vehicle rearwardly, both of said fresh air conduits having fresh air inlets at the forward ends thereof, heater means in said first fresh air conduit, a combining conduit connected to the rear ends of said fresh air conduits with valve means for controllably adjusting the amount of fresh air passing into said combining conduit from each of said fresh air conduits, said combining conduit extending into the upper part of the vehicle body and provided with an opening to discharge the outside air from said fresh air conduits into said upper part, another outlet connected to the lower end of said combining conduit for discharging air into said upper part below said combining conduit, a branching conduit connected to said second fresh-air conduit intermediate the front end and the rear end thereof and extending into the lower part of the vehicle, discharge means operatively connected with said branching conduit for discharging air forwardly and rearwardly substantially at seat height of the vehicle, a second heater means connected between said branching conduit and said discharge means, control means for selectively controlling the amount of air drawn into said branching conduit from said second fresh air conduit and from the inside of the vehicle, said control means including another conduit connected to said branching conduit extending with the open end thereof into said lower part, and a blower means located between said second heater means and said discharge means for aiding the discharge of the air heated by said second heater means, whereby the upper part of the vehicle is supplied with outside air only while the lower part of the vehicle is supplied with controllably variable amounts of outside air and recirculated air.

References Cited in the file of this patent

UNITED STATES PATENTS

| 1,751,686 | Duerk | Mar. 25, 1930 |
| 1,839,688 | Lintern et al. | Jan. 5, 1932 |
| 1,951,200 | Mullen et al. | Mar. 13, 1934 |
| 2,087,171 | Szostek | July 13, 1937 |
| 2,147,906 | Lintern | Feb. 21, 1939 |
| 2,237,333 | Bretzlaff et al. | Apr. 8, 1941 |
| 2,249,946 | Darrah et al. | July 22, 1941 |
| 2,253,671 | Whitney | Aug. 26, 1941 |
| 2,256,724 | Onishi et al. | Sept. 23, 1941 |
| 2,360,617 | Onishi et al. | Oct. 17, 1944 |
| 2,372,377 | Hans | Mar. 27, 1945 |
| 2,445,392 | Findley | July 20, 1948 |